United States Patent [19]
Kinney et al.

[11] 4,151,926
[45] May 1, 1979

[54] MULTI-SECTION ELECTRICAL WIRING BOX

[75] Inventors: David W. Kinney; Kenneth M. Moore, both of Parkersburg; Edwin L. Sprout, Walker, all of W. Va.

[73] Assignee: Union Insulating Company, Parkersburg, W. Va.

[21] Appl. No.: 718,874

[22] Filed: Aug. 30, 1976

[51] Int. Cl.² .................................. H02G 3/08
[52] U.S. Cl. .................................... 220/3.94
[58] Field of Search ............... 220/3.92, 3.94, 4 R

[56] References Cited
U.S. PATENT DOCUMENTS

| | | | |
|---|---|---|---|
| 2,838,989 | 6/1958 | Clark et al. | 220/4 R X |
| 3,168,613 | 2/1965 | Palmer | 220/3.94 X |
| 3,514,526 | 5/1970 | Arnold, Jr. | 220/3.94 X |
| 3,580,411 | 5/1971 | Mills | 220/4 R |
| 3,690,501 | 9/1972 | Ware | 220/3.94 |

FOREIGN PATENT DOCUMENTS

| | | | |
|---|---|---|---|
| 101124 | 10/1962 | Norway | 220/4 R |
| 1127110 | 9/1968 | United Kingdom | 220/3.94 |

*Primary Examiner*—Herbert F. Ross
*Attorney, Agent, or Firm*—Peter Xiarhos

[57] ABSTRACT

A plastic multi-section electrical wiring box assembled from a plurality of individual sections. The individual sections are constructed so as to be capable of being mechanically and physically interconnected with each other without the need for mechanical assembly apparatus. The various sections are further adapted to be used with a bonding material such as an adhesive or solvent welding material to insure positive, permanent connections between the various sections.

15 Claims, 13 Drawing Figures

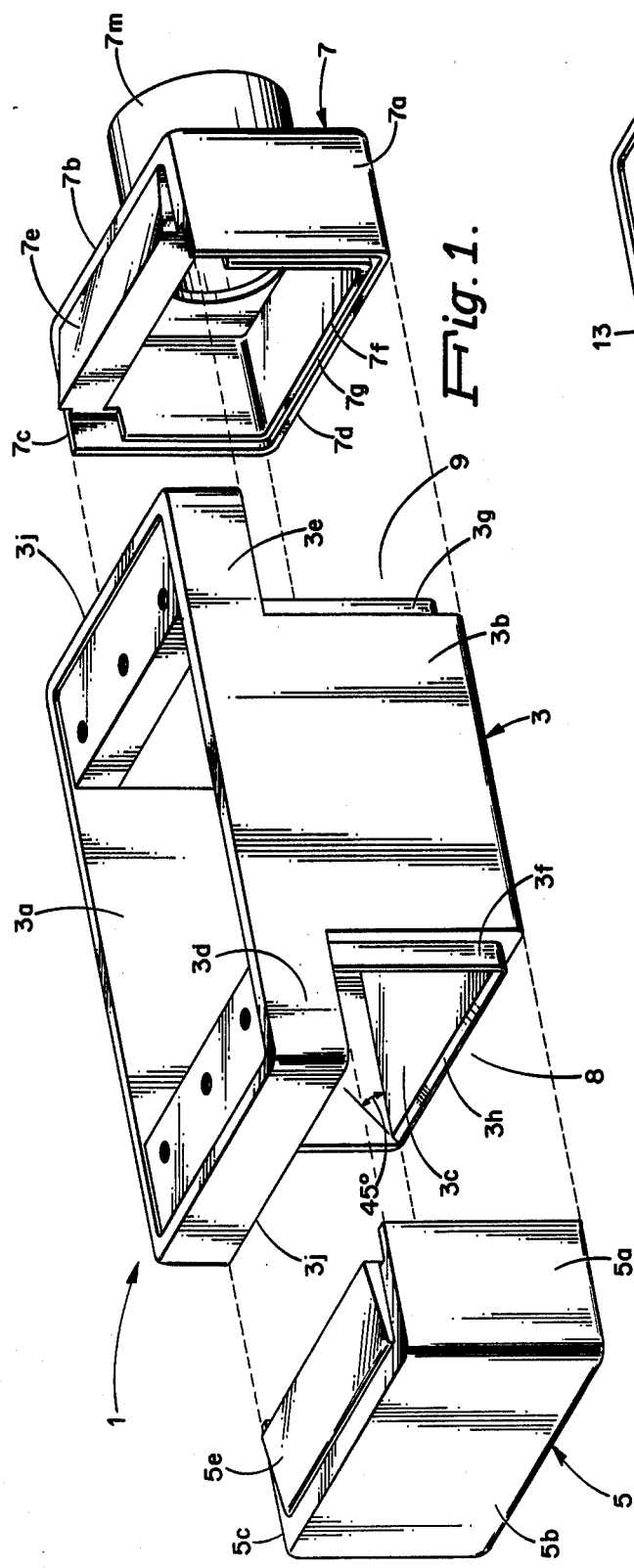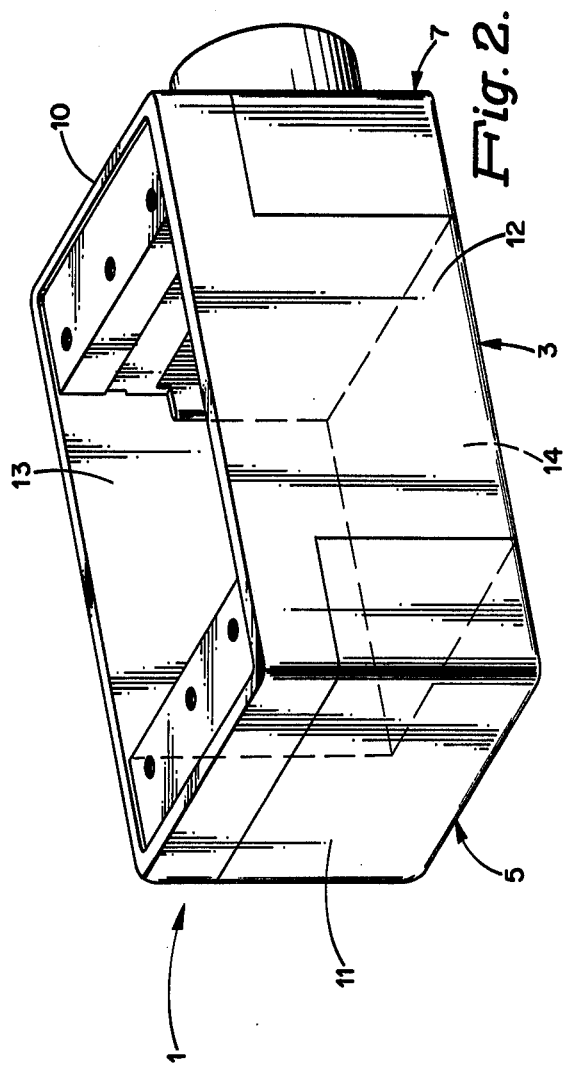

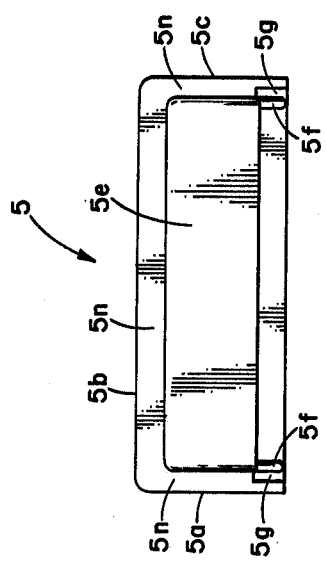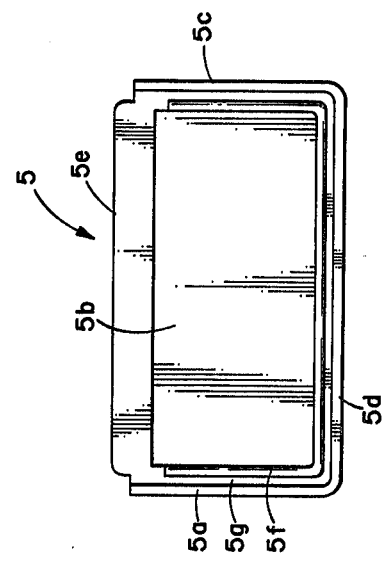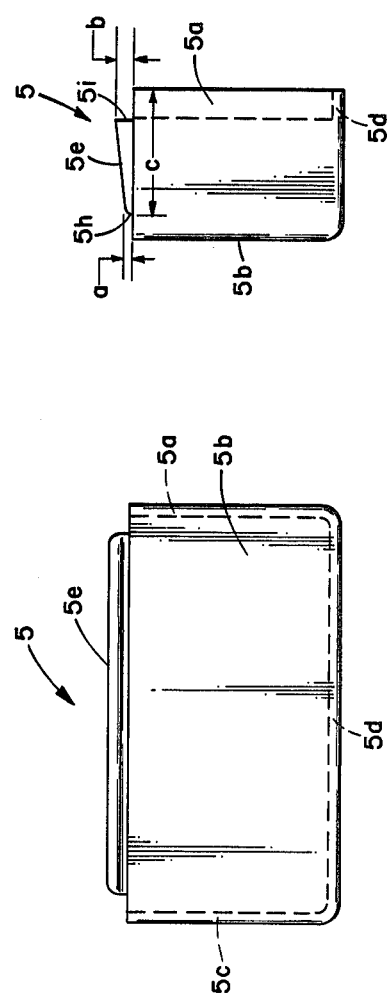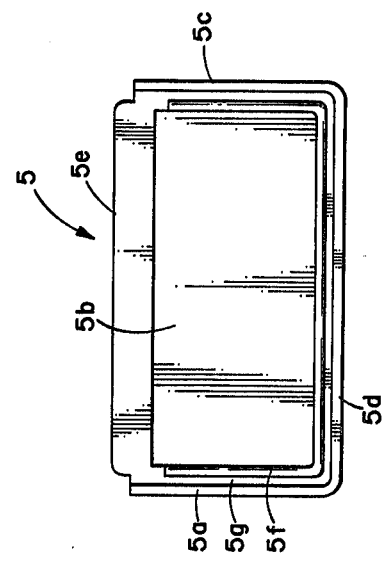

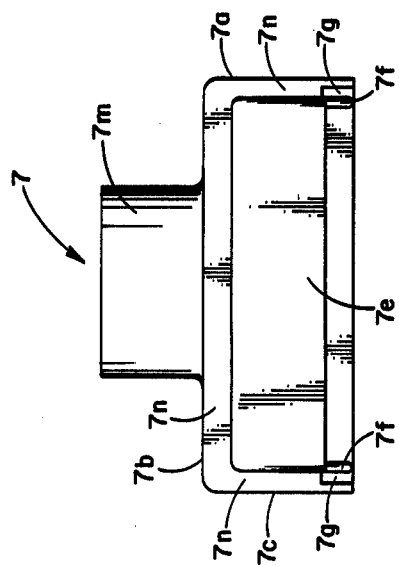
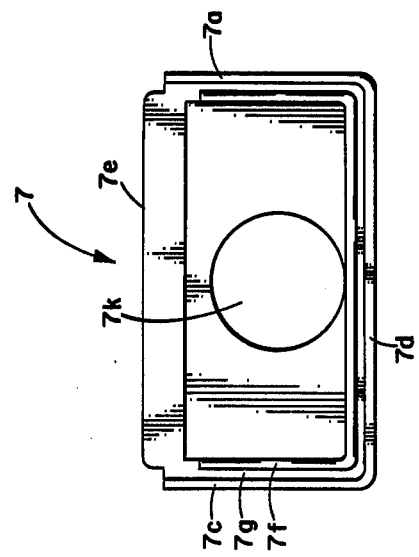
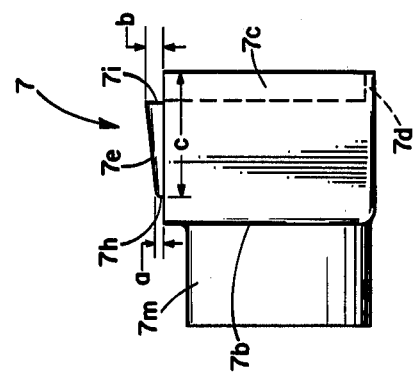
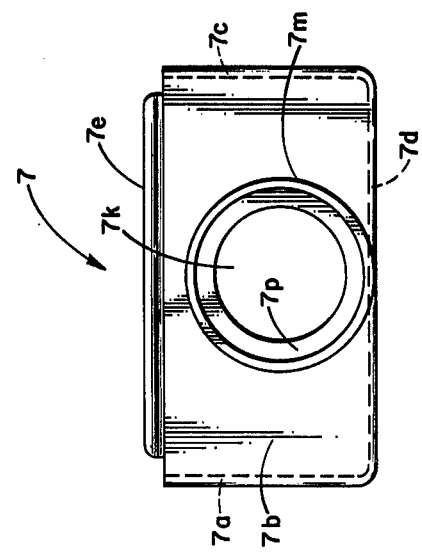

MULTI-SECTION ELECTRICAL WIRING BOX

BACKGROUND OF THE INVENTION

The present invention relates to an electrical wiring box and, more particularly, to a plastic multi-section electrical wiring box assembled from a plurality of individual sections.

In each of U.S. Pat. Nos. 3,168,613 and 3,514,526, in the names of L. E. Palmer and W. O. Arnold, Jr., respectively, and assigned to the same assignee as the present application, there is described a plastic electrical wiring box primarily for use with plastic conduit and formed from a plurality (e.g., two or more) of interconnected sections. The sections may be similar or selected from a large number of different possible types and configurations for establishing an even larger number of possible overall configurations for the wiring boxes. By way of example, a wiring box may be custom-made from a standard central section interconnected with two end sections, each of which may be selected from several possible types and shapes for connection with a single conduit, a pair of conduits, or no conduits, as determined by the particular desired overall configuration and application for the final assembled wiring box. Wiring boxes formed in accordance with the aforementioned U.S. Pat. No. 3,168,613 include two similar sections with mating edges and surfaces which are joined together, either as part of a factory assembly operation or by a worker in the field, by using an adhesive or solvent welding material between the mating edges and surfaces. Wiring boxes formed in accordance with the aforementioned U.S. Pat. No. 3,514,526 include a central section and two end sections with mating edges and surfaces are discussed above, and further have shoulders formed integrally with the end sections for positioning within recesses of the central section. This latter positioning operation serves to prevent longitudinal outward movement of the end sections relative to the central section.

While wiring boxes as described hereinabove and in the aforementioned U.S. Pat. Nos. 3,168,613 and 3,514,526 can be assembled in a simple and straightforward manner, the assembly operation nonetheless requires the use of jigs, clamping or other apparatus for holding and clamping the various sections together until the adhesive or solvent welding material has set sufficiently to permanently secure the various sections together. The requirement of the abovementioned apparatus, as well as the labor and time required to assemble wiring boxes from sections, has tended to discourage the assembly and use in the field by workers of wiring boxes formed from a number of individual sections as described hereinabove. Instead, such workers have looked to the manufacturer of the sections to supply the desired wiring boxes in an already assembled form or otherwise to supply the wiring boxes in the more traditional single-body form. Thus, the advantages of wiring boxes formed from sections, specifically, in reducing the inventory of wiring boxes or sections or in reducing tooling costs associated with the manufacture of a small number of standardized types of sections, have not been fully realized and available to workers in the field.

BRIEF SUMMARY OF THE INVENTION

In accordance with the present invention, a multi-section electrical wiring box is provided which can be assembled in the field by a worker from individual sections without the requirement of jigs, clamping or other assembly apparatus, thereby overcoming the problems and disadvantages associated with prior art assembly techniques as discussed hereinbefore.

In accordance with one form of the invention, the multi-section electrical wiring box comprises first and second sections which are adapted to be assembled together to define walls for the wiring box and a space for the reception therein of a device, for example, an electrical switch or receptacle. One of the sections includes a flange portion and the other of the sections has a complementary groove formed therein for the reception and retention therein of the flange portion. The flange portion is adapted to be introduced into the groove, and the first and second sections are operable to pivot with respect to each other, by way of the flange portion and the groove, to cause the flange portion to be positioned and retained within the groove. The electrical wiring box further includes locking means formed as parts of the first and second sections. The locking means is operative as the first and second sections are caused to pivot with respect to each other and the flange portion is positioned and retained within the groove to mechanically and physically secure together the first and second sections into an assembled condition. To insure a more permanent interconnection between the first and second sections, a bonding means, such as an adhesive or solvent welding material, may be applied between the first and second sections prior to the sections being secured together, the bonding means being operable to permanently bond the sections together once the sections have been mechanically and physically secured together.

BRIEF DESCRIPTION OF THE DRAWING

Various objects, features and advantages of an electrical wiring box assembled from a plurality of individual sections in accordance with the present invention will be apparent from the following description taken in conjunction with the accompanying drawing in which:

FIG. 1 is an exploded perspective view of an electrical wiring box assembled from a plurality of individual sections in accordance with the present invention;

FIG. 2 is a perspective view of the electrical wiring box as assembled together in accordance with the invention;

FIGS. 3, 4, 5, and 6 are front, side and first and second end views, respectively, of a first end section employed by the electrical wiring box in accordance with the present invention;

FIGS. 7, 8, 9 and 10 are front, side and first and second end views, respectively, of a second end section employed by the electrical wiring box in accordance with the present invention;

DETAILED DESCRIPTION OF THE INVENTION

Figure 11:
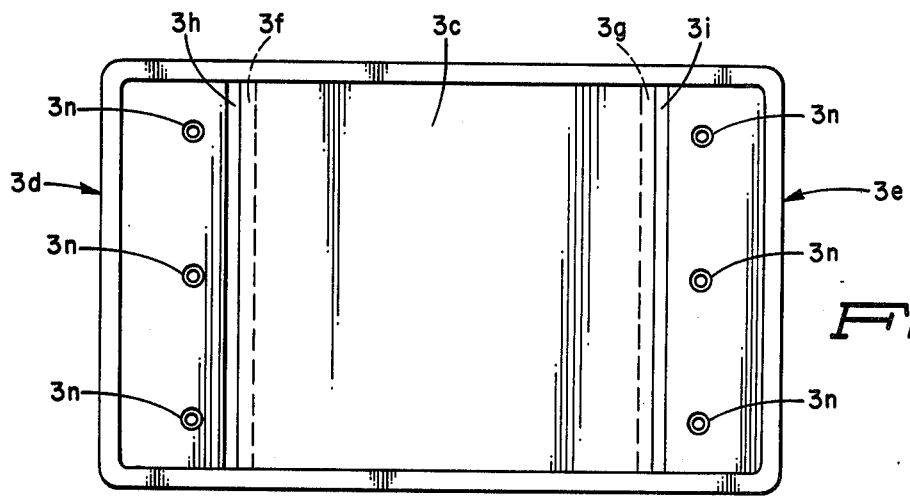
FIGS. 11 and 12 are front and rear views, respectively, of a central section employed by the electrical wiring box in accordance with the invention.

Referring now to FIGS. 1 and 2, there is shown an electrical wiring box 1 in accordance with the present invention. As shown in FIG. 1 and 2, the electrical wiring box 1 is assembled together from a number of individual sections including a central or main body section 3, a first end section 5 and a second end section 7. The central section 3 is basically T-shaped in configuration and defines a pair of open end regions 8 and 9 for receiving the two end sections 5 and 7, respectively. Although the end section 5 is shown in FIGS. 1 and 2 as lacking any means for connection with an external member such as a conduit and the end section 7 is shown as having means for connection with a single conduit, it is to be appreciated that either or both of the sections 5 and 7 may have means for connection with a single conduit, a pair of conduits or no conduits, as determined by the particular application intended for the wiring box.

As shown in FIG. 2, when the end sections 5 and 7 are attached to or engaged with the central section 3, the wiring box 1 has a generally rectangular overall configuration with a top wall 10, a bottom wall 11, a pair of side walls 12 and 13, and a rear wall 14. These walls define an opening at the front of the wiring box 1 and further enclose a space or volume for receiving an electrical device such as an electrical switch or receptacle as well as wires and other electrical connections associated with the electrical device. Although the end sections 5 and 7 are shown in FIGS. 1 and 2 to be positioned at the bottom and top ends of the wiring box 1, respectively, it is to be appreciated that, by virtue of the manner in which the various sections 3, 5 and 7 are constructed, to be discussed in greater detail hereinafter, the sections 5 and 7 are interchangeable and their positions with respect to the central section 3 can be easily and simply reversed from the positions as shown in FIGS. 1 and 2. The sections 3, 5 and 7 may be suitably fabricated from a thermoplastic or thermosetting resin material, using standard molding techniques as are well understood by those skilled in the art.

FIGS. 3–12 illustrate in detail the nature of the various sections 3, 5 and 7. These sections, and the manner in which they are interconnected together to produce the final wiring box 1, will now be described in detail.

As shown in FIG. 1 and 3-6, the end section 5 includes a plurality of flat wall portions 5a–5d interconnected together to provide an overall generally-rectangular configuration for the end section 5. As indicated in FIG. 2, the configuration of the end section 5 generally conforms to the configuration of the open end region 8 defined by the T-shaped central section 3. The end section 5 further includes an inclined ramp portion 5e formed integrally with the wall portions 5a–5c and between the wall portions 5a and 5c, and a thin, generally U-shaped portion 5f, best shown in FIG. 6, spaced from the edges of the wall portions 5a, 5c and 5d. The U-shaped portion 5f establishes, together with the wall portions 5a, 5c and 5d, a generally U-shaped groove or channel 5g. As will be explained in greater detail hereinafter, the ramp portion 5e, which has first and second raised edges 5h and 5i and which slopes upwardly from a minimum height "a" to a maximum height "b", as shown in FIG. 4, is employed together with the groove 5g for mechanically and physically attaching or engaging the end section 5 with the central section 3. The groove 5g is also adapted to receive a bonding material such as an adhesive or solvent welding material for establishing a more permanent connection between the sections 3 and 5.

In a similar manner as described hereinabove, the end section 7, which is shown in detail in FIGS. 1 and 7–10, includes a plurality of wall portions 7a–7d interconnected together to provide an overall generally-rectangular configuration conforming to the general configuration of the open end region 9 as defined by the T-shaped central section 5. The section 7 further includes an inclined ramp portion 7e formed integrally with the wall portions 7a–7c and between the wall portions 7a and 7c, and a thin, generally U-shaped portion 7f spaced from the edges of the wall portions 7a, 7c and 7d and establishing, together with the edges of the wall portions 7a, 7c and 7d, a generally U-shaped groove or channel 7g. As in the case of the end section 5, the ramp portion 7e of the end section 7 has first and second raised edges 7h and 7i and slopes upwardly from a minimum height "a" to a maximum height "b", as shown in FIG. 8. The ramp portion 7e is used in conjunction with the groove 7g for mechanically and physically attaching the end section 7 to the central setion 3. The groove 7g is also adapted to receive a bonding material such as an adhesive or solvent welding material for establishing a more permanent connection between the sections 3 and 7. The wall portion 7b of the end section 7 as described hereinabove further has a circular opening 7k provided therein surrounded by a cylindrical boss 7m. The boss 7m is adapted to receive a section or length of conduit (not shown) for connection with the wiring box 1 to permit electrical wiring conducted along the conduit to gain access to the interior of the wiring box 1. The forward entry of the section or length of conduit into the end section 7 is limited by an annular stop shoulder 7p formed in the end section 7 at the interface of the wall portion 7b and the boss 7m.

Figure 12:
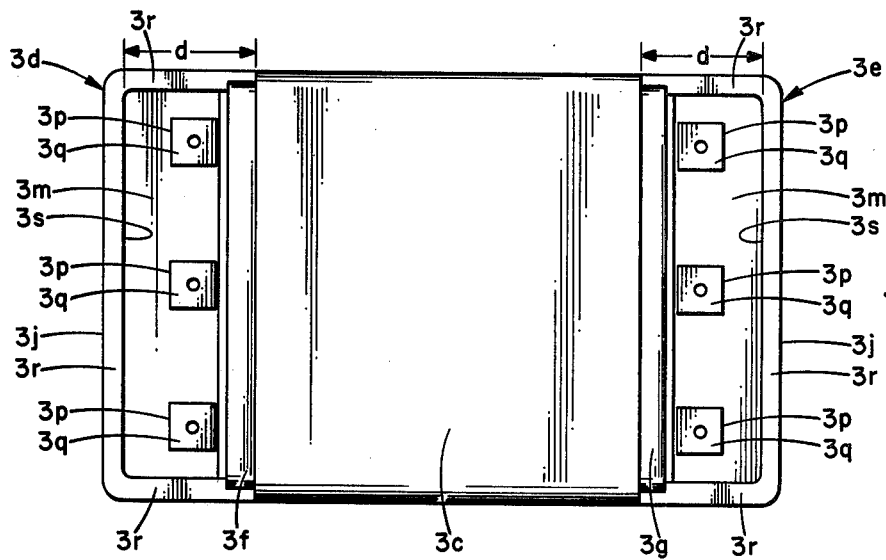

The central section 3, which is shown in detail in FIGS. 1, 11 and 12, includes a pair of opposed central wall portions 3a and 3b, best shown in FIG. 1, bridged by a rear wall portion 3c, best shown in FIG. 12, and connected with a pair of end portions 3d and 3e. The wall portions 3a–3c further have a pair of thin, generally U-shaped flanges 3f and 3g formed at the edges thereof. As will be explained hereinafter, the flanges 3f and 3g are adapted to be positioned within the similarly-shaped grooves 5g and 7g in the end sections 5 and 7, respectively, and for this reason are made to have dimensions insuring a reasonably tight fit for the flanges 3f and 3g within the grooves 5g and 7g. The introduction and positioning of the flanges 3f and 3g within the grooves 5g and 7g, and the subsequent interconnection of the central section 3 with the end sections 5 and 7, is further facilitated by tapering or beveling the edges of the horizontal portions of the flanges 3f and 3g intermediate to the central wall portions 3a and 3b, as shown at 3h in FIG. 1 and 3h and 3i in FIG. 11, at angles of approximately 45° with respect to the plane of the bottom wall portion 3c.

The aforementioned end portions 3d and 3e of the central section 3 are used to engage the ramp portions 5e and 7e of the end sections 5 and 7 during the interconnection of the various sections 3, 5 and 7, to be described in greater detail hereinafter, and also to serve as a means by which an electrical device (e.g., a receptacle or switch, not shown) may be mounted within the assembled wiring box 1 and a cover plate (not shown) attached to the wiring box 1. As shown in FIG. 12, the end portions 3d and 3e include upstanding rim portions 3j which define and partially enclose recesses or cavities 3m for the reception therein of the ramp portions 5e and 7e of the end sections 5 and 7, as will be discussed hereinafter. The end portions 3d and 3e as described hereinabove further have three pairs of openings 3n formed therein, as shown in FIG. 11, with the openings 3n being terminated, as best shown in FIG. 12, in rectangular recesses 3p. The recesses 3p are adapted to receive rectangular metal nuts 3q which are permanently secured within the recesses 3p as by the use of a bonding material. The center pair of openings 3n and the corresponding center pair of nuts 3q are used with screws (not shown) to mount an electrical device within the wiring box 1 and the outer pairs of openings 3n and corresponding nuts 3q are used with screws (also not shown) to secure a cover plate to the wiring box 1. Although not shown in the drawings, openings may be provided through the ramp portions 5e and 7e of the end sections 5 and 7 to allow the passage therethrough of any particularly lengthy screws which may be used in connection with the pairs of openings 3n and nuts 3q.

Figure 13:
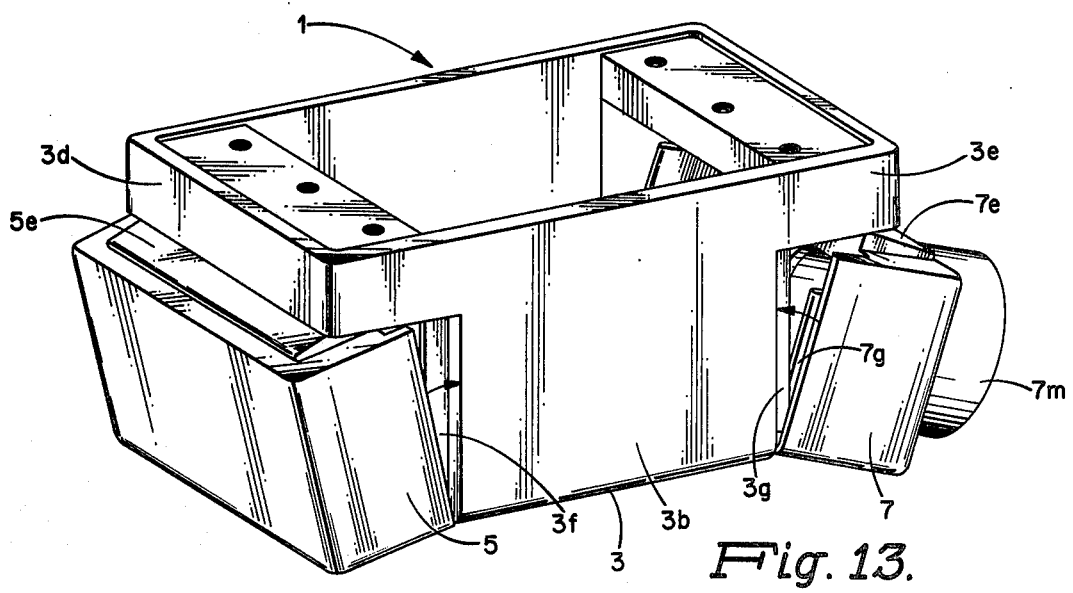
FIG. 13 is a perspective view illustrating the manner in which the central section and the end sections may be interconnected together to produce the final assembled wiring box in accordance with the invention.

The various sections 3, 5 and 7 as described hereinabove are manually interconnected together to produce the final wiring box 1 by mechanically and physically interlocking the sections together, preferably using a bonding material such as an adhesive or solvent welding material between the mating parts and surfaces to establish permanent connections between the sections and rendering the wiring box 1 equivalent to a wiring box of single-body construction. The interconnection of the sections 3, 5 and 7 may be accomplished in the following manner. Firstly, a bonding material such as an adhesive or solvent welding material is placed within the grooves 5g and 7g of the end sections 5 and 7 and also along the exposed edges of the walls 5a–5c adjacent to and partially surrounding the ramp portion 5e, shown at 5n in FIG. 3, and the exposed edges of the walls 7a–7c adjacent to and partially surrounding the ramp portion 7e, shown at 7n in FIG. 7. The tapered horizontal portions 3h and 3i of the U-shaped flanges 3f and 3g of the central section 3 are then manually inserted into the horizontal portions of the U-shaped grooves 5f and 7f formed in the end sections 5 and 7. Each of the end sections 5 and 7 is then pivoted toward the central section 3, as shown in FIG. 13, using the tapered portions 3h and 3i of the flanges 3f and 3g as pivot points. As the end sections 3 and 5 are pivoted toward the central section 3, the flanges 3f and 3g of the central section 3 more completely enter the grooves 5g and 7g, and inner edges 3j of the end portions 3d and 3e, shown at 3r in FIG. 12, ride along the inclined outer surfaces of the ramp portions 5e and 7e. This action continues until the edges 3r of the rim portions 3j override the lower edges 5h and 7h of the ramp portions 5e and 7e, and the inner surfaces of the rim portions 3j, shown at 3s in FIG. 12, abut against the lower edges 5h and 7h of the ramp portions 5e and 7e. At this time, the flanges 3f and 3g are completely within the grooves 5g and 7g, the ramp portions 5e and 7e are completely within the corresponding recesses 3m in the end portions 3d and 3e, and the edges 3r of the rim portions 3j abut against the edges 5n and 7n of the end sections 5 and 7. The completion of the above operations by which the end sections 5 and 7 are interconnected with the central section 3 is evidenced by "clicking" or "snapping" sounds as the end sections 5 and 7 snap into and lock with the central section. Any excess bonding material which may be present at the seams of the sections 3, 5 and 7 may then be wiped off. To insure that a very tight mechanical fit is established between the sections 3, 5 and 7, the distance between the lower edge of the ramp portion 5e and the edges of the walls 5a and 5c, shown at "c" in FIG. 4, is made to be about equal to the width of the end portion 3d, as shown at "d" in FIG. 12, and, similarly, the distance between the lower edge of the ramp portion 7e and the edges of the walls 7a and 7c, shown at "c" in FIG. 8, is made to be about equal to the width of the end portion 3e, as shown at "d", in FIG. 12.

Once the abovedescribed assembly operations have been completed, a section or length of conduit may then be secured within the boss 7i of the end section 7, using the same bonding material as was used to join together the various sections 3, 5 and 7. Once the bonding material applied to the various sections 3, 5 and 7 as to the boss 7i has set or cured, the installer of the wiring box 1 may then proceed with the usual operations of mounting an electrical device within the wiring box 1 and making the necessary electrical connections, and securing a cover plate to the wiring box 1.

It is now believed that a wiring box 1 has been described which can be quickly and readily assembled from a number of individual sections by a worker in the field without the need for jigs, clamping or other assembly apparatus. A small number of different standardized sections, including interchangeable sections, may be employed to produce an even greater number of overall types of wiring boxes, thereby reducing the inventory of sections required to be kept on hand by workers in the field to meet current requirements and allowing workers to custom-make wiring boxes in the field to suit a wide variety of applications. The same bonding materials as are already used in the field to interconnect conduits to wiring boxes may also be used to join together the sections of the wiring boxes, thereby obviating the need for a worker to bring new or additional materials to the job site.

While there has been described what is considered to be a preferred embodiment of the invention, it will be obvious to those skilled in the art that various changes and modifications may be made therein without departing from the invention as called for in the appended claims.

What is claimed is:

1. A multi-section electrical wiring box comprising:
   first and second sections adapted to be assembled together to define walls for said wiring box and a space for the reception therein of a device;
   one of said sections including a flange portion and the other of said sections having opposing spaced-apart portions defining a complementary groove therebetween for the reception and retention therein of the flange portion, said flange portion being adapted to be introduced into the groove and said first and second sections being operable to pivot with respect to each other, by way of the flange portion and the groove, to cause the flange portion to be positioned and retained within the groove; and
   locking means formed as parts of the first and second sections and operative as the first and second sections are caused to pivot with respect to each other and the flange portion is positioned and retained within the groove to mechanically and physically secure together the first and second sections into an assembled condition;
   said locking means comprising:
      a ramp portion formed as part of one of the sections and having an inclined outer surface and a raised edge surface; and an engagement portion formed as part of the other one of the sections, said engagement portion being operative as the first and second sections pivot with respect to each other and the flange portion becomes positioned within the groove to ride along the inclined outer surface of the ramp portion and when the flange portion has been positioned and retained completely within the groove, to override the ramp portion and engage the raised edge surface of the ramp portion thereby to mechanically and physically secure together the first and second sections into an assembled condition.

2. A multi-section electrical wiring box in accordance with claim 1 further comprising:
bonding means applied between the first and second sections prior to the sections being secured together and operable to permanently bond the sections together once the sections have been mechanically and physically secured together.

3. A multi-section electrical wiring box in accordance with claim 1 wherein:
the flange portion is formed as part of the first section and the groove is formed in the second section; and
the ramp portion is formed as part of the second section and the engagement portion is formed as part of the first section.

4. A multi-section electrical wiring box in accordance with claim 3 wherein:
the flange portion of the first section is generally U-shaped in configuration; and
the groove formed in the second section is generally U-shaped in configuration.

5. A multi-section electrical wiring box in accordance with claim 4 wherein:
the horizontal part of the generally U-shaped flange portion has a beveled edge for facilitating the introduction of the flange portion into the generally U-shaped groove and for facilitating the pivoting of the first and second sections with respect to each other.

6. A multi-section electrical wiring box in accordance with claim 5 wherein:
the second section includes first and second generally-parallel side walls portions interconnected with end and bottom wall portions, said side wall and end wall portions having edge surfaces in a common plane;
and wherein:
the ramp portion is interconnected intermediate to the first and second side wall portions adjacent to the edge surfaces of the side wall and end wall portions; and
the engagement portion of the first section includes edge surfaces adapted to abut against the edge surfaces of the side wall and end wall portions of the second section when the first and second sections have been mechanically and physically secured together.

7. A multi-section electrical wiring box in accordance with claim 6 further comprising:
bonding means applied within the groove formed in the second section and to the edge surfaces of the side wall and end wall portions of the second section and operable to permanently bond the first and second sections together once the flange portion of the first section has been positioned and retained completely within the groove formed in the second section and the edge surfaces of the engagement portion of the first section have abutted against the edge surfaces of the side wall and end wall portions of the second section.

8. A multi-section electrical wiring box comprising:
a central section and first and second end sections adapted to be assembled together to define walls for said wiring box and a space for the reception therein of a device;
said central section including first and second flange portions, and each of said end sections having opposing portions defining a groove therebetween corresponding to a different one of the flange portions of the central section;
each of said flange portions being adapted to be introduced into the corresponding one of the grooves and each end section and the central section being operable to pivot with respect to each other, by way of the flange portion and the corresponding groove, to cause the flange portion to be positioned and retained within the corresponding groove; and
first and second locking means formed as parts of the central section and the end sections and operative as the central section and each end section are caused to pivot with respect to each other and each of the flange portions of the central section is positioned and retained within the corresponding groove to mechanically and physically secure together the central section and the end sections;
said first and second locking means comprising:
first and second ramp portions formed as part of the first and second end sections, respectively, and each having an inclined outer surface and a raised edge surface; and
first and second engagement portions formed as parts of the central section and corresponding to the first and second end sections and to the first and second ramp portions, respectively, each of said engagement portions being operative as the central section and the corresponding end section pivot with respect to each other and the flange portion of the central section becomes positioned within its corresponding groove to ride along the inclined outer surface of the corresponding ramp portion and, as the flange portion has been positioned and retained completely within its corresponding groove, to override the end of the ramp portion and engage the raised edge surface of the ramp portion thereby to mechanically and physically secure together the central section and the end section into an assembled condition.

9. A multi-section electrical wiring box in accordance with claim 8 wherein:
the first and second flange portions of the central section are generally U-shaped in configuration; and
the grooves formed in the first and second end sections are generally U-shaped in configuration.

10. A multi-section electrical wiring box in accordance with claim 9 wherein:
the horizontal parts of the generally U-shaped flange portions have beveled edges for facilitating the introduction of the flange portions into the corresponding generally U-shaped grooves in the end sections and for facilitating the pivoting of the central section and the end sections with respect to each other.

11. A multi-section electrical wiring box in accordance with claim 10 wherein:

each of the end sections includes first and second generally-parallel side wall portions interconnected with end and bottom wall portions, said side wall and end wall portions having edge surfaces in a common plane;

and wherein:

the first and second ramp portions are interconnected intermediate to the first and second side walls of the first and second end sections, respectively, adjacent to the edge surfaces of the side wall and end wall portions of the associated end sections; and the first and second engagement portions of the central section include edge surfaces adapted to abut against the edge surfaces of the side wall and end wall portions of the first and second end sections when the central section and the first and second end sections have been mechanically and physically secured together.

12. A multi-section electrical wiring box in accordance with claim 11 wherein:

the central section is generally T-shaped in configuration defining first and second open end regions and having a central portion with first and second generally U-shaped edge surfaces and first and second end portions on opposite sides of the central portion;

the first and second flange portions are formed at the first and second edge surfaces, respectively, of the central portion of the central section, and the first and second end sections are arranged to be positioned within the first and second open end regions, respectively, of the central section; and the first and second engagement portions of the central section are formed as parts of the first and second end portions, respectively, of the central section.

13. A multi-section electrical wiring box in accordance with claim 12 further comprising:

bonding means applied within the grooves formed in the first and second end sections and to the edge surfaces of the side wall and end wall portions of the first and second end sections and operabe to permanently bond the first and second end sections and the central section together once the first and second flange portions of the central section have been positioned and retained completely within the grooves formed in the first and second end sections and the edge surfaces of the first and second engagement portions of the central section have abutted against the edge surfaces of the side wall and end wall portions of the first and second end sections.

14. A multi-section electrical wiring box in accordance with claim 13 wherein:

the first and second end sections and the central section are formed of a plastic material.

15. A multi-section electrical wiring box in accordance with claim 14 wherein:

one of the end sections has an opening in the end wall portion thereof surrounded by a boss portion for receiving in said boss portion a section of conduit.

* * * * *